2,996,286
EVAPORATOR PROVIDED WITH A VERTICAL NEST OF TUBES
Georges Jean Henri Trepaud, 17 Rue Legendre, Paris, France
Filed June 10, 1958, Ser. No. 741,100
Claims priority, application France June 13, 1957
6 Claims. (Cl. 257—223)

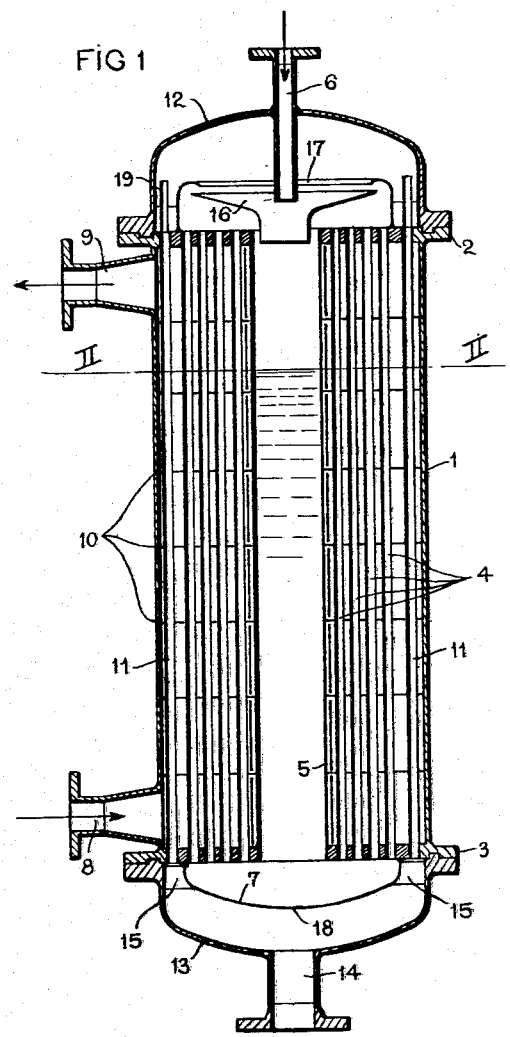

The present invention relates to an improved type of evaporator provided with a vertical nest of tubes for the production of cold.

One already knows an evaporator for the production of cold in which the cold producing liquid rises up in a nest of vertical tubes round which the brine or the fluid to be cooled is circulated.

In this apparatus, the whole inner surface of the tubes is wetted and this improves the thermal exchanges through the wall of the tubes but, on the other hand, this increases the amount of non-vaporized liquid which is carried along in the form of droplets by the vapor escaping from the upper part of the nest of tubes. For this reason, this type of evaporator is surmounted by a dome, from 1 to 3 meters high, in which the droplets progressively loose their ascending speed, whereby they fall back in a central descending collector which brings this liquid to the lower part of the nest of tubes.

On the other hand, the separation and the recovery of the oil which is carried along by the cold producing liquid while it is passing through the compressor can only be performed in this evaporator if the cold producing liquid is not, or is very little, miscible with the lubricating oil, as it is the case for ammonia; in this case the oil is decanted and drops in the lower part of the evaporator, where it can be recovered by periodical drainings.

On the contrary, when using a cold producing liquid such as freon with which oil is miscible in any proportion, this oil, instead of dropping in the lower part of the evaporator, remains mixed in the liquid rising up in the nest of tubes and also in the droplets which are carried along by the vapor escaping from the upper part of the nest of tubes. As this damp vapor is dried by means of a device, such as a drying dome, which brings back the droplets in the liquid feeding the lower part of the nest of tubes, this would, in such a case, result in continuously increasing the percentage of the oil mixed with this liquid; the viscosity of the liquid would increase in the same proportion, which would bring about a reduction of the calorific exchanges in the nest of tubes and simultaneously a reduction of the efficiency of the evaporator. For this reason, the drying of the damp vapor produced by a freon evaporator of this known type is usually carried out in a temperature exchanger apart from the evaporator in which this vapor flows in a countercurrent either to the brine or liquid to be cooled, or to the cold producing liquid before said brine or liquid gets into the evaporator: each reheats said damp vapor and brings about the vaporization of the droplets carried along; the oil which was mixed with these droplets is carried along in the compressor by the dry vapor, provided that the speed of said vapor exceeds 5 meters per second.

This process allows to keep to constant values the percentage of the oil in the liquid freon and the efficiency of the cold producing plant, but it requires an apparatus independent of the evaporator, each of both apparatuses being eventually fed by a proper circuit with the brine or the fluid to be cooled. Thereby the process is costly and the calorific balance is rather bad.

One object of the invention is to provide an evaporator of the type above described, in which the preceding drawbacks are suppressed. A further object of the invention is to provide an evaporator which, for drying the damp vapor escaping from the upper part of the nest of tubes and for preventing an eventual return in the cold producing liquid of the oil which is eventually carried along by said vapor, includes a second nest of vertical tubes, which also dip in the brine or the fluid to be cooled and through which this vapor is sucked from the top toward the bottom thereof.

A further object of the invention is to provide an evaporator of the type indicated above, in which the drying dome is suppressed, which results in a gain of several meters in the vertical space required, and is interesting in many cases, particularly for the plants in the cooling ships.

A further object of the invention is to provide an evaporator which also allows to use a cold producing liquid such as freon, without being obliged to adjoin to the apparatus a special exchanger to dry the vapor and which, nevertheless, prevents the oil carried along from returning in the cold producing liquid which feeds the nest of tubes.

The profit resulting from the suppression of an additional apparatus is further increased by an improvement in the calorific balance of the plant, since the vaporization of the cold producing liquid and the drying of the vapor are carried out by means of one and the same circuit for the brine or liquid to be cooled.

By way of example, a preferred embodiment of the evaporator according to the invention is described hereafter and diagrammatically illustrated in the accompanying drawings.

FIGURE 1 is a longitudinal sectional view of the preferred embodiment;

FIGURE 2 is a section on line II—II of FIG. 1;

FIGURE 3 is a longitudinal sectional view of a part of one of the tubes of the second vertical nest, provided with an inner member in the shape of an Archimedean screw; and FIGURE 4 is a longitudinal sectional view of a portion of the evaporator showing a modification thereof.

The preferred embodiment of the vertical evaporator illustrated in FIGS. 1 and 2 includes the same component members as the known vertical evaporators: a cylindrical casing 1 the two bases of which are closed by plates 2 and 3 in which are expanded the ends of the tubes 4 of the nest in which the liquid to be vaporized will rise up. As shown in FIG. 2, the tubes are preferably regularly disposed inside a closed volume, preferably a cylindrical one, the axis of which is occupied by a wider tube 5: the cold producing liquid coming from the pipe 6 flows down through this tube 5 in a container 7, fixed to the base plate 3, under the lower ends of the tubes 4 and 5.

The brine or liquid to be cooled flows, through a pipe 8, in the lower part of the casing 1, and is discharged out, at the upper part, through the pipe 9 after having been circulated, in the annular space between 1 and 5, through baffles intended to slow down its flowing speed and thereby to improve the calorific exchanges between the brine or the fluid to be cooled which is licking the outer surface of the tubes 4 and the cold producing fluid which rises up in these tubes 4. The baffles are preferably of the helical type, they are formed for instance by flat rings 10, each provided with a notch in the shape of a sector and interconnected with each other by vertical members disposed along the edges of these notches, said notches being offset with respect to each other of a same angle, as indicated in the French patent to the inventor, No. 797,552, filed on May 7, 1935.

According to the present invention, a space is provided between the wall of the casing 1 and the nest of tubes 4; a second nest of vertical tubes 11 is disposed in this space, the ends of these tubes being also expanded in the base plates 2 and 3. As shown in FIG. 2, the tubes of this second nest are preferably placed near each other and very close to the outer tubes of the first nest of tubes, forming thereby a narrow row surrounding entirely the first nest of tubes.

The tubes 11 are also immersed in the brine or liquid to be cooled which flows out from the pipe 8.

The casing 1 is surmounted by a bell 12 fixed to the base plate 2 and through which passes the pipe 6 supplying the cold producing liquid; this bell is not high and replaces the drying dome, several meters high, which was provided in the vertical evaporators known up to now.

The lower part of casing 1 is closed by a second bell, fixed to the base plate 3 and including a piping 14 connected with the suction circuit of the vapor.

As the diameter of the base of the container 7 is smaller than the diameter of the bell 13, which is about the same as the diameter of the casing 1, an annular space 15 is formed between 7 and 13, in which the lower ends of the tubes 11 of the second nest open.

A deflecting device, such as described in the French patent to the inventor, No. 1,113,751, filed on January 10, 1950, may be disposed above the upper ends of the tubes 4 of the first nest. In the illustrated embodiment, a funnel 16 is fixed above the upper end of the tube 5 and its free upper edge is surmounted by an annular deflector 17 disposed to form with the funnel a narrow annular opening which deflects the vapor perpendicularly to the axis of the casing 1.

This evaporator works as follows:

The cold producing liquid supplied through the pipe 6 flows down through the tube 5 in the container 7, from where it rises up in the tubes 4 of the first nest of tubes, whereby it wets the whole of the walls thereof; the brine or the liquid to be cooled, arriving through 8 while transporting the calories withdrawn from the utilization circuit, reheats the cold producing liquid as this liquid rises up in the tubes 4; an important portion of this cold producing liquid is evaporated at the upper part of the tubes 4 from where escapes, above the base plate 2, a very damp vapor, that is to say a vapor carrying along plenty of droplets of non-evaporated fluid.

The passing of this damp vapor through the annular deflector opening brings about a first drying of this vapor; the narrow opening of this deflector imparts to the vapor and to the droplets carried along a high radial speed in the direction of the axis of the casing 1. The expansion of the vapor escaping from this aperture reduces the horizontal component of the speed of the molecules of this vapor, and adds to it an important vertically ascending component, whereas the droplets preserve their high horizontal speed and gain a vertically descending component, owing to the gravity and to their high density. Therefore a plurality of these droplets parts from the ascending vapor and fall on the funnel 16, from where they come back, through the tube 5, into the container 7. The still damp vapor is sucked out from the bell 12 through the upper ends of the tubes 11 which open about on a level with the free edge of the deflector 17. This arrangement allows to obtain a uniform feeding of all the tubes 11 of the second nest, that is to say the passing of the same amount of vapor, through each tube, said vapor carrying along a same percentage of non vaporized liquid, which is essential to obtain a high efficiency in the plant. If the upper parts of the tubes opened on a level with the base plate 2, the liquid, streaming down upon the inner face of the wall of the bell 12 and upon the outer face of the deflector 17 would, irregularly flow in these tubes, which would result in an unsteady working of said tubes.

The extension of the upper ends of the tubes 11 above the base plate 2 can easily be obtained, for instance by means of sleeves 19 (FIG. 3), made of thin metal-sheets and forced in these tubes.

When the still damp vapor flows through the tubes 11 of the second nest, the liquid droplets carried along by this vapor are brought into contact with the walls of these tubes by means of baffles or, preferably, by a kind of helical member, in the shape of an Archimedean screw (such as shown by 18 in FIG. 3) which imparts a horizontal speed to these droplets. This contact allows the calorific exchanges between the liquid droplets flowing down with the vapor through the tubes 11 and the brine or the liquid to be cooled ascending in contact with these tubes through the baffles 10.

The brine or the liquid to be cooled thereby heats the droplets carried along by the damp vapor and brings about their evaporation. The vapor arriving in the chamber 15 limited by the bell 13 and the container 7 is dry and it is sucked therefrom through the pipe 14; the feeding with the cold producing liquid is carried out by a thermostatic expander.

The level of the cold producing liquid in the central tube 5, indicated by the line II—II, settles spontaneously at a critical height which depends for each evaporator, upon the regime of the temperatures and the rate of evaporation.

Reciprocally, by keeping the level of the liquid at a given suitable height, particularly by means of a self-acting governor provided with a float, the optimum working conditions for the evaporator can be obtained.

When the cold producing liquid that is used is very little or not at all miscible with the lubricating oil of the compressor, as it is the case for ammonia, the fractions of this oil which are carried along by the cold producing liquid deposit by gravity on the bottom of the container 7 and, as a consequence, the liquid ascending in the tubes 4 and the liquid droplets carried along by the vapor in the bell 12 do not practically contain any oil.

As shown on FIGURE 4 the oil accumulated on the bottom of the container 7 can be drawn off through a draining pipe 20 which opens at the lower part of the container 7 and passes through the vapor suction chamber between 7 and 13. A portion of the oil thus recovered can be sent back in the casing of the compressor.

On the contrary, when the cold producing liquid is very miscible with the lubricating oil, as it is the case for the Freon, which is miscible in any proportion with the oil, the fractions of this oil which are carried along by the cold producing liquid keep mixed with the droplets of this liquid which are carried by the vapor out of the nest of tubes 4; a small portion of this oil falls back in the container 7 with the droplets with which this oil is mixed and which are stopped by the deflector 17, but all the remainder of this oil, after the evaporation in the tubes 11 of the second nest, of the droplets which transport it, is carried along by the dry vapor into the chamber 15 and into the piping 14 in which the speed of this vapor exceeds 5 meters/second.

This oil is thereby brought back by the dry vapor into the casing of the compressor in which it counterbalances partly the previous losses of oil resulting from said oil being carried away by the cold producing liquid.

What I claim is:

1. Evaporator including a vertical cylindrical casing the two bases of which are closed by plates, a wide tube disposed along the axis of said casing and passing through its two base plates, an upper bell tightly mounted on the upper base plate of this casing, an admission pipe for the cold producing liquid, opening into said upper bell above the upper aperture of said axially disposed, wide tube, a lower container in the shape of a cup, tightly mounted below the lower base plate of said casing so that the lower end of said wide tube opens therein and the cold producing liquid flowing in the admission pipe flows down therein through this wide tube, a first nest of tubes disposed in this casing round the axially disposed wide tube so that their ends pass through the base plates of this casing and open in the upper bell and in the lower container, respectively, whereby the cold producing liquid rises up in the tubes of the first nest about to the same level as in the wide tube, an admission pipe and an outlet pipe, respectively connected with opposed ends of this cylindrical casing, to circulate therein round the tubes of the first nest the fluid to be cooled so that the liquid rising up in these tubes is partly evaporated by a thermal exchange with the circulating fluid which is thereby cooled, a second nest of tubes disposed in this casing in a narrow row round the first nest of tubes so that the ends of the tubes of said second nest pass through the base plates of this casing and respectively open, on the one hand, in said upper bell and, on the other hand, outside and around said lower container, an annular deflector disposed in this upper bell above the upper ends of the tubes of the first nest, a funnel disposed above the upper opening of the wide tube to form with said deflector a narrow annular opening whereby a part of the droplets of the cold producing liquid which are carried along by the vapor escaping from the first nest, when passing through this annular opening, forms a deposit on this funnel and falls therethrough in the wide tube, a lower bell mounted below the lower container and tightly fixed to the periphery of the lower base plate of the casing so that the lower ends of the tubes of the second nest open therein, a piping connected with this lower bell to suck the vapor of cold producing liquid through the tubes of the second nest and through this lower bell, so that this damp vapor is reheated in the second nest of tubes by a second thermal exchange with the fluid to be cooled and the liquid droplets still carried along by this vapor are evaporated.

2. Evaporator according to claim 1 in which each tube of the second nest includes an inner member in the shape of an Archimedean screw, which is disposed to bring the liquid droplets carried along by the vapor of the cold producing liquid into contact with the wall of the tube.

3. Evaporator including a vertical cylindrical casing the two bases of which are closed by plates, a wide tube disposed along the axis of said casing and passing through its two base plates, an upper bell tightly mounted on the upper base plate of this casing, an admission pipe for the cold producing liquid, opening into said upper bell above the upper aperture of said axially disposed wide tube, a lower container in the shape of a cup, tightly mounted below the lower base plate of said casing so that the lower end of said wide tube opens therein and the cold producing liquid flowing in the admission pipe flows down therein through this wide tube, a first nest of tubes disposed in this casing round the axially disposed, wide tube so that their ends pass through the base plates of this casing and open in the upper bell and in the lower container, respectively, whereby the cold producing liquid rises up in the tubes of the first nest about to the same level as in the wide tube, an admission pipe and an outlet pipe, respectively connected with opposed ends of this cylindrical casing, to circulate therein round the tubes of the first nest the fluid to be cooled so that the liquid rising up in these tubes is partly evaporated by a thermal exchange with the circulating fluid which is thereby cooled, a second nest of tubes disposed in this casing in a narrow row round the first nest of tubes so that the ends of the tubes of said second nest pass through the base plates of this casing and respectively open, on the one hand, in said upper bell and, on the other hand, outside and around said lower container, an annular deflector disposed in this upper bell above the upper ends of the tubes of the first nest, a funnel disposed above the upper opening of the wide tube to form with said deflector a narrow annular opening whereby a part of the droplets of the cold producing liquid which are carried along by the vapor escaping from the first nest, when passing through this annular opening, forms a deposit on this funnel and falls therethrough in the wide tube, a lower bell mounted below the lower container and tightly fixed to the periphery of the lower base plate of the casing so that the lower ends of the tubes of the second nest open therein, a piping connected with this lower bell to suck the vapor of cold producing liquid through the tubes of the second nest and through this lower bell, so that this damp vapor is reheated in the second nest of tubes by a second thermal exchange with the fluid to be cooled and the liquid droplets still carried along by this vapor are evaporated, and a drain pipe passing through this lower bell and connected with the bottom of this lower container for the cold producing liquid to recover the oil carried along by the cold producing liquid and decanted on the bottom of said container.

4. Evaporator including a closed casing, a first nest of tubes and a wider tube extending vertically through said closed casing, a closed container in which the lower ends of said first nest of tubes and of said wider tube open, means to circulate a fluid to be cooled through said closed casing, along said first nest of tubes, means for supplying a cold-producing liquid to said wider tube to maintain a constant level of cold-producing liquid in said wider tube whereby said liquid passes downwardly from said wider tube into said container and thence upwardly into said first nest of tubes, where it is partly evaporated to heat exchange with the fluid to be cooled, means to separate the damp vapor from the un-evaporated cold-producing liquid escaping from the upper ends of said first nest of tubes, and to bring back said un-evaporated cold-producing liquid into the upper end of the wider tube, a second nest of tubes extending vertically through the closed casing, and means to circulate said damp vapor separated from the un-evaporated cold-producing liquid downwards through said second nest of tubes, whereby said damp vapor is heated and dried by further heat exchange with the fluid to be cooled.

5. Evaporator according to claim 4, in which each tube of the second nest includes inner means to bring the liquid droplets carried along by the damp vapor circulated therethrough into contact with the wall of the tube.

6. Evaporator including a closed casing, a first nest of tubes and a wider tube extending vertically through said closed casing, a closed container in which the lower ends of said first nest of tubes and of said wider tube open, means to circulate a fluid to be cooled through said closed casing, along said first nest of tubes, means for supplying a cold-producing liquid to said wider tube to maintain a constant level of cold-producing liquid in said wider tube, whereby said liquid passes downwardly from said wider tube into said container and thence upwardly into said first nest of tubes, where it is partly evaporated by heat exchange with the liquid to be cooled, means to separate the damp vapor from the un-evaporated cold-producing liquid escaping from the upper ends of said first nest of tubes, and to bring back said un-evaporated cold-producing liquid into the upper end of the wider tube, a second nest of tubes extending vertically through the closed casing, means to circulate said damp vapor separated from the un-evaporated cold-producing liquid downwards through said second nest of tubes, whereby said damp vapor is heated and dried by further heat exchange with the liquid to be cooled, and means to drain off the oil carried along by the cold producing liquid and decanted on the bottom of said container.

References Cited in the file of this patent

UNITED STATES PATENTS 1,335,506    Jones _____ Mar. 30, 1920

FOREIGN PATENTS 426,731    Italy _____ Nov. 6, 1947